(No Model.)
M. S. CABELL.
FEED WATER PURIFIER.
No. 560,685. Patented May 26, 1896.
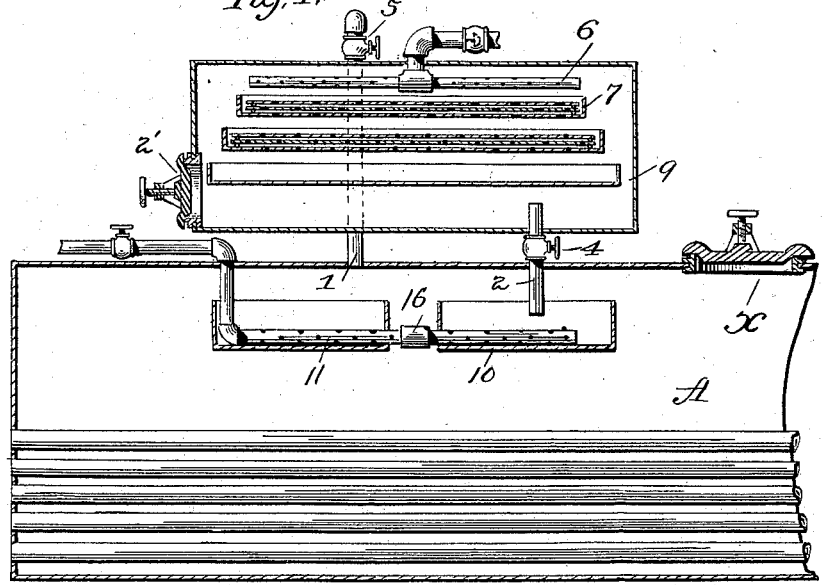
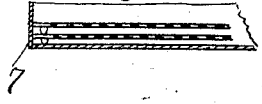
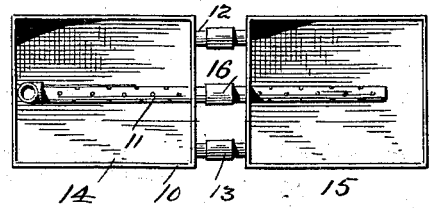
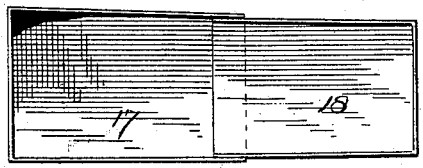
Attest
Wm. F. Hall
James M. Shear
Inventor
Milton S. Cabell
by Walter Douglass
Atty

UNITED STATES PATENT OFFICE.

MILTON S. CABELL, OF QUINCY, ILLINOIS.

FEED-WATER PURIFIER.

SPECIFICATION forming part of Letters Patent No. 560,685, dated May 26, 1896.

Application filed December 26, 1894. Serial No. 532,944. (No model.)

*To all whom it may concern:*

Be it known that I, MILTON S. CABELL, a citizen of the United States, residing at Quincy, in the county of Adams and State of Illinois, have invented certain new and useful Improvements in Feed-Water Purifiers, of which the following is a specification, reference being had therein to the accompanying drawings.

It is my object to provide a feed-water purifier in which the feed-water will be broken up into sprays or drops, which as they fall will be subjected to steam-pressure and also to the galvanic action of perforated electropositive and electronegative plates onto which the feed-water falls and through which it passes.

In the drawings, Figure 1 is a sectional view of the boiler and purifier. Fig. 2 is a plan view of an extensible catch-pan, and Fig. 3 is a plan view of a modification. Fig. 4 is a detail view showing the galvanic plates in contact with the pan to effect the electrical connection between them.

The boiler A is of ordinary form. Surmounting the same is the feed-water drum, connected with the boiler by the steam-pipe 1 and the water-pipe 2, the latter being arranged to convey the purified feed-water from the drum to the boiler. This pipe extends above the bottom of the drum $x$, and thus a settling-space is provided for sediment. The drum is provided with a manhole 2' at one end, and by closing the valves 4 5 in the steam and water pipes the purifying-drum may be cleaned without stopping the working of the boiler. The inlet-pipe for the feed-water discharges the same through a preferably perforated pipe 6 into a pan 7, suitably supported in the drum and having, preferably, a series of perforations in its bottom, through which the water passes in drops, thus dividing the water up to be subjected to the action of the live steam from the boiler. From the first pan the water falls into a second pan, slightly larger than the first, and this also is perforated, and from this the water, again divided up, falls into a pan 9, having an imperforate bottom to act as a settling-pan, and from here the water, flowing over the sides of the pan, falls to the bottom of the drum, where a further settling takes place, and from here the water, thoroughly purified, passes through the discharge-pipe into the boiler.

In the perforated pans I place electropositive and electronegative plates lying flat therein, these plates being perforated and preferably slightly separated at suitable points to allow the water to pass between them and be subjected to the galvanic action between the plates. These perforated plates are shown at 30. This further purifies the water, which, being thoroughly distributed over the perforated plates, is freely divided and then subjected to the said action.

The water falling into the boiler is discharged into a settling-pan 10, having a blow-off pipe 11, perforated and extending along its bottom, and this serves to blow out any sediment which might collect therein. In many boilers the manhole or cover is formed in the top, as indicated at $x$, Fig. 1, and so arranged that it is impossible to introduce a pan of full size. In this case I employ a sectional or extensible pan, the sections being introduced separately or collapsed and then properly set or extended afterward.

In Fig. 2 I show one form of sectional pan, in which the sections are connected by the pipes 12 and the unions 13. In this case the sections 14 15 would be introduced separately and then joined up afterward. The blow-off pipe would also be formed in sections and connected by a union 16.

In the other form the sections 17 18 are arranged to collapse or telescope together when being introduced and distended when in the boiler.

In the inlet-pipe for the feed-water I arrange a check-valve to prevent the steam-pressure from acting through the inlet-pipe against the pump.

I do not limit myself to the number of pans used, nor to the construction of same, nor do I limit myself to the form or the construction of drum or means for obtaining access to the interior of drum.

The electropositive and electronegative plates are mechanically separated from each other by vulcanized rubber or other non-conducting material, while electrical contact between the plates may be maintained in any suitable way such as is well known in this art, and shown, for instance, in the United States Patent No. 528,851, dated November 6, 1894, to me—that is, by using the walls of the pan as the connection.

The galvanic elements may be of copper and zinc.

I claim—

1. A feed-water purifier, comprising the boiler, the pan arranged in the steam-space and having a series of perforations to divide the water up and the electropositive and electronegative plates in the pan, said plates having a series of perforations also, substantially as described.

2. In combination, the pan arranged in the steam-space and having a series of perforations to divide the water up to be subjected to the action of the steam, the electropositive and electronegative plates in the pan and the perforated inlet-pipe extending over the perforated pan to distribute the water thereto, substantially as described.

3. In combination, the boiler, the pan having a series of perforations, the steam-drum containing the same, the discharge-pipe from the drum to the boiler and the pan arranged in the boiler to receive the water from said pipe with means for blowing sediment from the pan, substantially as described.

4. In combination in a feed-water purifier, the boiler, the pan made in separate sections and arranged in the boiler and the sectional blow-off pipe one section of which is carried by each section of the pan, substantially as described.

5. In combination in a feed-water purifier, the boiler, a pan having a series of perforations to divide the water up, said pan being arranged in the steam-space and the electropositive and electronegative elements in the pan, substantially as described.

6. In combination in a feed-water purifier, the electropositive and electronegative plates and elevated distributer means having a plurality of discharges for feeding the water thereto in a broken or divided condition, substantially as described.

7. In combination in a feed-water purifier, the electropositive and electronegative plates, and means for spraying the water upon the same, said plates being arranged in a steam-space whereby the sprays or drops will be subjected to said steam in their passage from the distributer to the plates, substantially as described.

8. In combination in a feed-water purifier, the electropositive and electronegative plates having perforations for the passage of the feed-water and means for spraying the water upon the same.

9. In combination with a boiler and drum connected with each other by a steam-pipe, the electropositive and electronegative elements in the drum, the feed-water pipe leading to the drum and the discharge-pipe leading from the drum into the boiler and a receiving settling-pan in the said boiler into which the said pipe discharges the feed-water from the drum, substantially as described.

In testimony whereof I affix my signature in presence of two witnesses.

MILTON S. CABELL.

Witnesses:
HENRY E. COOPER,
WM. F. HALL.